United States Patent

Schenkerman

[15] 3,645,624
[45] Feb. 29, 1972

[54] RANGE-MEASURING METHOD AND APPARATUS

[72] Inventor: Stanley Schenkerman, Mamaroneck, N.Y.
[73] Assignee: The Perkin-Elmer Corporation, Norwalk, Conn.
[22] Filed: July 7, 1970
[21] Appl. No.: 52,971

[52] U.S. Cl.........................................356/5, 356/4, 343/13, 343/17.1
[51] Int. Cl..........................................G01c 3/08
[58] Field of Search.....................356/4, 5; 343/13, 14, 17.2, 343/17.1

[56] References Cited

UNITED STATES PATENTS 3,545,861  12/1970  Farnsworth et al..................343/13 R Primary Examiner—Rodney D. Bennett, Jr.
Assistant Examiner—S. C. Buczinski
Attorney—Edward R. Hyde, Jr.

[57] ABSTRACT

For measuring the distance from a point to a target a pulse of energy having a distinctive wavelength is sent at a predetermined velocity from the point. Echoes of the pulses reflected from the target are received at the point and echoes having only the distinguishing wavelength are processed. A successive pulse is sent when the echo of a previous pulse is received, or when no echo is received after a predetermined maximum elapse of time that is more than the time for an echo to be received from a target at the maximum expected distance from the point. The time to accumulate a predetermined number of responses is measured. The target distance is then proportional to the pulse velocity times one-half the time interval between the sensing of the first pulse and, either the receipt of the last echo or the elapse of a predetermined maximum time after the sending of the last pulse, less the total time of any such predetermined maximum elapses of time, divided by the total number of pulses sent less the number sent in response to any said maximum elapses of time. The foregoing steps eliminate errors due to noise and to echoes that are too weak to be received.

10 Claims, 1 Drawing Figure

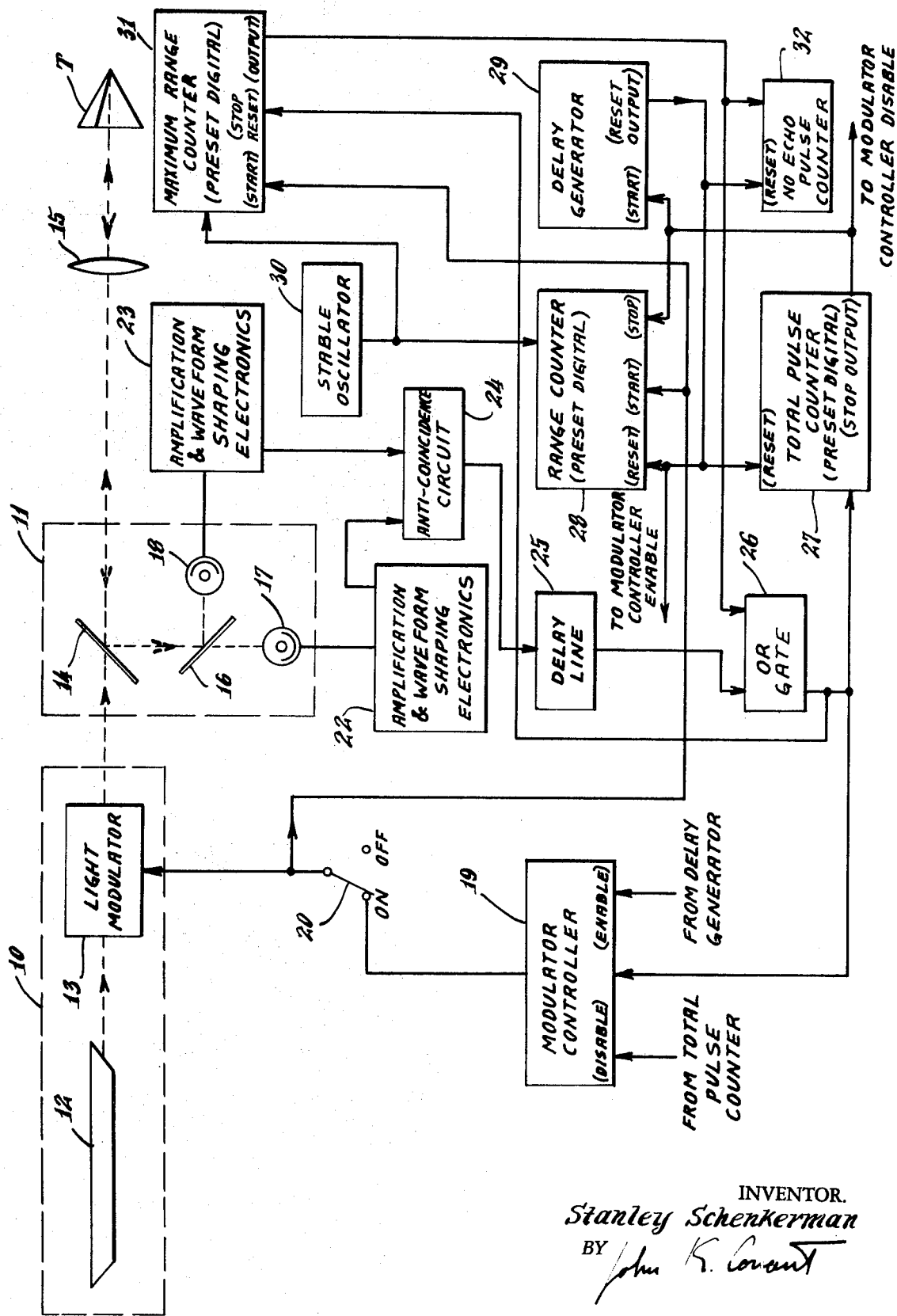

RANGE-MEASURING METHOD AND APPARATUS

The present invention relates to range-measuring systems in which range is measured by directing a pulse of propagatable energy (e.g., electromagnetic or sonic) at a known velocity at a target and measuring the time interval between the sending of the pulse and the receipt of the echo reflected back from the target, the distance to the target being one-half the time times the velocity. In particular the invention is an improved range-measuring system of the type disclosed in U.S. Pat. No. 3,503,680 in accordance with which the distance to a target is measured by sending a predetermined number of successive pulses toward the target and counting the time interval between the sending of the first pulse and the receipt of the echo of the last pulse sent. The distance to the target is then one-half total time interval times velocity divided by the number of pulses sent.

Particular problems with range-measuring systems of the subject type are that extraneous noise (e.g., electromagnetic or sonic) may be mistaken for an echo pulse or the echo pulse may be too weak to be received. These problems are a particular disadvantage with systems in which a sequence of pulses are used for the measurement since error induced by noise or weak pulses in the series is difficult or impossible to detect unless the resulting distance measurement is obviously incorrect.

It is a particular object of the present invention to provide a range-measuring system of the pulse sequence type in which the effects of extraneous noise and echo pulses too weak to be received are isolated and identified so that the correct distance to the target is computed on the basis of true echo pulses whereby the accuracy of the resulting measurement is reliable.

In accordance with the invention this object is accomplished by a system in which the echo-receiving elements distinguish between true echoes and noise and in which an echo too weak to be received is taken into account by measuring a predetermined maximum elapse of time after the sending of a pulse. The latter time is the time within which an echo pulse would be received from the target a maximum expected distance from the pulse source. If a true pulse is received before the elapse of this maximum time only the true pulse is counted. If, however, no pulse echo is received within this time, this is counted in a total pulse counter and in a no echo pulse counter. This elapse of time is also counted in a total time counter and is utilized to cause a successive energy pulse to be sent. The system is set to receive and register a predetermined number of responses which may be either pulse echoes or no-echo pulse signals and, until the set number of responses are received, the sending of each successive pulse after the first is initiated by either the receipt of a true echo or by a no-echo pulse signal.

When the last response of the set registers, the system stops. At this point the system has registered data for a rough total distance measurement on the basis of the total time elapsed and the total number of echo pulses. It has also registered separately the total of no-echo pulse signals from which the total distance represented thereby is known since each no-echo pulse signal represents a predetermined distance. Thus the accurate distance is readily determined by subtracting the total distance represented by the no-echo pulse signals from the rough distance and dividing by the total number of responses in the set less the number of no-echo pulse signals received. The computations involved may be done manually, or the system may incorporate known types of computing devices for doing them automatically.

The system of this invention may be operated with pulses of energy, such as electromagnetic or sonic pulses, that are adapted to be sent toward a target and reflect back to a suitable receiver at which the echo pulses received are converted to electrical signals. In order to provide true echoes for measurement the energy pulses sent are given a predetermined wavelength or narrow band of wavelengths. The noise, which may be received at the receiver instead of or along with a true echo, will normally be a group of energy waves having a number of different wavelengths, including the selected wavelength or band of the energy pulses utilized by the system and other wavelengths. For sorting out and measuring only the true echo pulses, filter means are associated with the receiver to separate the input to the receiver into two separate energy beams, one consisting only of energy having the selected wavelength or band for the system and the other including energy having other wavelengths. Since noise includes energy waves having the same selected narrow wavelength utilized by the system, it is necessary to isolate the input to the receiver which consists only of a true echo wave and to disregard all other inputs. Accordingly, both the separated beams are fed to discriminating means which generate an output signal to actuate the remainder system only in response to receipt of the one beam having the selected narrow wavelength; that is, if two beams, one having the selected narrow wavelength or band and the other having other wavelengths, are received simultaneously by the discriminating means no output signal will be generated.

A method and apparatus embodying the present invention is described herein with reference to a system utilizing light pulses, though waves of other forms of energy could also be used. For this purpose light pulses reflected from the target are suitably filtered by means of a beam splitter which separates the input into one light beam having the selected narrow wavelength and another light beam having other wavelengths. EAch of these light beams is converted into an electrical signal by means of suitable photodetectors. These signals, after being amplified and being given a more workable wave form, are fed to an anticoincidence circuit which performs the function of the aforesaid discriminating means by generating an output signal only in response to a signal representing a light beam of the selected narrow wavelength.

The system would be adapted to use sound waves by similarly selecting a narrow wavelength or band for the sound pulse, filtering the sound input to a suitable sound receiver into separate energy beams, one having the selected wavelength and the other having other wavelengths, and then transforming the separate beams of sound energy into representative signals to be applied to an anticoincidence circuit as above.

Further objects, advantages and features of the improved range-measuring system of this invention will be apparent from the following description of an illustrative embodiment shown in the accompanying drawing which is a schematic diagram.

Referring to the drawing, in the system of the present invention a transmitter 10 sends a pulse of propagatable energy at a predetermined velocity toward a target T from which the energy pulse is reflected back as an echo to be received by a receiver 11, which in operation may be placed to be at substantially the same point relative to the target as the transmitter 10.

The transmitter 10 shown is a combination of a light source 12, in the form of a laser, which produces light having a distinctive narrow wavelength, and an electrically actuated light modulator or shutter 13, such as a Kerr cell, which forms the light into pulses. From the transmitter 10 a beam of light pulses passes through a beam splitter 14, which is also part of the receiver 11, and through a lens system 15, shown as a single lens, to the target T. Light striking the target is reflected back through the lens system 15 to the beam splitter 14 which redirects the reflected light down to a filtering beam splitter 16 of the receiver 11. The purpose of the lens system 15 is first to collimate the light transmitted through the beam splitter 14 to the target T, and then to focus the reflected beam of light pulses at light detectors 17 and 18, which are in the receiver in line with he respective split beams formed by the beam splitter 16.

The light modulator 13, which passes light from the transmitter 10 in the form of pulses, is controlled by a modulator controller 19 to which it is coupled through an on-off switch 20. The apparatus shown operates by sending successive light pulses to the target, counting the responses, which may be true echo signals or signals indicating no echo, as described below, and counting the time. After a predetermined number of responses are received, the modulator controller 19 is disabled so as to stop the generation of light pulses for a preset delay period during which the data record may be taken from the system—visually or electronically. At the end of the delay period the data-recording elements are reset automatically and the modulator controller 19 is enabled in preparation for the next measuring operation.

For starting a measuring operation, the laser 12 being on, the first pulse of light is initiated by switching on switch 20 to actuate the modulator controller 19. Thereafter, the response to a pulse is utilized to initiate another pulse until the predetermined number of responses are received.

In the receiver 11 the beam splitter 16, to which reflected light from the target T is directed by the beam splitter 14, is made to transmit to the photodetector 17 only light having the narrow wavelength of the light from the light source 12, and to reflect the balance of the light to the photodetector 18. The photodetectors 17 and 18 generate electric signals in response to light pulses received by them and are coupled to amplification and wave-shaping systems 22 and 23 respectively. These systems 22 and 23 are a type well known in the art and amplify the signals as well as shaping them, by sharpening the leading edges of the pulse signals. The latter signals are then fed to an anticoincidence circuit 24 which is adapted to generate an output signal only in response to a pulse signal received from the photodetector 17, which signal represents a true echo pulse from the target. In order to discriminate signals representing true echo pulses from noise, which would be expected to include light of the selected narrow wavelength, any signal produced by the photodetector 18 and thus representing noise wavelengths, from which the true echo wavelength is separated by beam splitter 16, signals from both photodetectors are fed to the anticoincidence circuit 24 which is constructed so as to produce an output signal only in response to a signal photodetector 17 and not when signals are received from either the noise photodetector along or from both photodetectors simultaneously.

The output side of the anticoincidence circuit 24 is connected through a delay line 25, the purpose of which is to put into the system a fixed delay time "$t_d$" so as to enable the system to make and properly record very small distance measurements. The delay line 25 may be any suitable type such as a mercury delay line, an electrical delay line, a digital delay line or a shift register.

From the delay line 25 an output signal from the anticoincidence circuit 24 is conducted to an OR-gate element 26 through which the signal is applied to the modulator controller 19 which is thereby operated to cause the light modulator 13 to send another light pulse toward the target. The gate element also directs this signal to a total pulse preset digital counter 27, the purpose of which is to count the number of input signals received from the gate 26. The gate 26 is constructed in a conventional manner with appropriate elements, such as diodes for keeping the circuits through it separate and confining them to the directions and distribution described herein.

The total pulse counter 27 is coupled to the modulator controller 19, to a range preset digital counter 28, and to a delay generator 29. The range counter 28 is coupled to the on-off switch 20 at the side toward the light modulator 13, and to an oscillator 30 which is also coupled to a maximum range preset digital counter 31. The maximum range counter 31 is connected to feed its output to the gate element 26; and is connected to the on-off switch 20 at the side toward the light modulator 13.

The range counter 28 and the maximum range counter 31 both operate in the same manner and may both be the same type. They are suitably preset counters that can be preset to a predetermined negative number and that will start, and stop and reset, on command.

The purpose of the oscillator 30 is to apply a continuous stream of pulses at a stable frequency $f_o$ to the range counter 28 and to the maximum range counter 31.

The purpose of the total pulse counter 27 is to count the number of signals received from the gate element 26, to stop the range counter 28, to disable the modulator controller 19 and to start the delay generator 29.

The delay generator 29, which is suitably a one-shot multivibrator, provides a time delay after a complete measuring cycle i.e., after the total pulse counter 27 has counted the (i.e., of signals from the gate element 26 it was preset to count). At the end of the time delay, it resets the total pulse counter 27, the range counter 28 and a no-echo pulse counter 32, and actuates the modulator controller 19 to start another range measurement cycle.

The maximum range counter 31 is connected into the system to count a predetermined maximum elapsed time after a pulse has been sent from the transmitter 10 and receiver 11. It is connected, as shown, to be started by the operation of the modulator controller 19 when the latter is actuated to cause the light modulator 13 to send a light pulse. Thereafter it counts time up to the preset maximum, unless it is stopped and reset by a signal from the gate element 26 in response to the receipt of a true echo pulse by the receiver 11 before the elapse of the maximum time set. If no such true echo pulse signal is received before the end of the maximum time count, the maximum range counter 31 directs an output signal to the gate element 26 which in turn directs the signal to the total pulse counter 27, to be counted, and back to stop and reset the range counter 31. The no-echo pulse counter 32 is connected to the output side of the range counter 31 to count the no-echo pulse output signals therefrom. The no-echo pulse counter is connected to be reset by the delay generator 29 after the end of one range-measuring cycle.

In the operation of the system, the total pulse counter 27 is preset to a predetermined number $n$ of signals from the gate element 26; these may be signals either from the anticoincidence circuit 24, indicating receipt of a true echo pulse, or signals from the maximum range counter 31, indicating that no echo pulse was received within the preset maximum elapsed time set into the counter 31. Any number may be chosen for $n$; the larger the $n$, the higher the resolution of the system. However, the larger the $n$, the lower the sampling rate at which measurements can be made. For example, $n$ can be set at 10,000 in which case it will take 10,000 signals from the gate element 26 to complete one range measurement.

The range counter 28 is preset to a number equal to ($-n \cdot t_d f_o$) where $n$ is the preselected number of signals, $t_d$ is the delay time of the delay line 25 of $f_o$ is the frequency of oscillator 30.

Turning on the on-off switch 20 initiates the first light pulse from the light modulator 13. This first pulse starts the range counter 28 and the maximum range counter 31. If a true echo pulse of light is received from the target T, it passes through the beam splitter 16 to be converted into an electric signal by the photodetector 17. This signal produces an output signal from the anticoincidence circuit 24 to pass through delay line 25 and gate element 26. From gate 26 this true echo pulse signal goes to the total pulse counter 27 where it is counted, to the modulator controller 19 for initiating a successive light pulse from the transmitter 10, and to the maximum range counter 31 for stopping and resetting the latter.

If, after a pulse of light is sent from the transmitter 10, no echo is received within the maximum time set into the maximum range counter 31, or if, due either to an echo being too weak to actuate the photodetector 17 or to noise interference, no output signal is generated by the anticoincidence circuit 24; the maximum range counter 31 counts out its maximum preset time and generates its output signal. As noted above, this output signal is counted by the no-echo pulse counter 32, passes through the gate element 26 to register in the total pulse counter 27, operates the modulator controller 19 to initiate a successive light pulse, and resets the maximum range counter 31.

When the preset number of signals from the gate 26 are registered by the total pulse counter 27, the latter generates a stop pulse which stops the range counter 28 and starts the delay generator 29. This stop pulse also disables the modulator controller 19, preventing further transmission of light pulses to the target. The delay generator 29 then counts out its preset delay time, at the end of which it applies an output signal to reset the no-echo pulse counter 32, the total pulse counter 27 and the range counter 28, and to actuate the modulator controller 19 to send the initial light pulse which starts another range-measuring sequence.

When the total pulse counter 27 stops the system at the end of a range-measuring cycle, the range counter 28 has counted the total time interval from the sending of the first pulse of a sequence to the receipt of the last signal of the number to be registered by the total pulse counter 27. This last signal may represent either a true echo pulse received or the elapse of a maximum reset time without a true echo being received. The time interval thus counted is a number equal to $(n-P)(2r/c+t_d)+P(2R/c+t_d)$, where $r$ is the distance to the target, $c$ is the velocity of the pulse propagated, $P$ is the number of no-echo pulses initiated by output signals from the maximum range counter 31, $2R/c+t_d$ is the time preset in the maximum range counter 31 ($R$ being the greater than maximum expected distance to the target T) and $c$ and $t_d$ are the pulse velocity and a time delay constant as previously defined. For determining the correct distance to the target T, this total time interval number must be reduced by an amount indicated by the relationship $P(2R/c+t_d)$.

From the data thus supplied, the correct distance to the target from the point at which the transmitter 10 and receiver 11 are placed, can readily be determined manually, or automatically, by coupling the counting elements of the system to conventional computer elements.

It will be appreciated that some modifications and variations may be made in the method and apparatus described above, which are illustrative of the invention, without departing from the scope of the invention as defined by the following claims.

What is claimed is:

1. A method of measuring the distance from a point to a target comprising: sending a pulse of propagatable energy at a predetermined velocity toward the target from said point to produce an echo, said pulse having a preselected narrow wavelength, receiving at said point an echo having the latter wavelength, sending another similar pulse when an echo of a previous pulse is received at said point, also sending such a pulse if no echo is received within a predetermined maximum time elapsing after sending a previous pulse, said maximum time being the time it would take to receive an echo from the target if the target were a predetermined distance away greater than the maximum distance expected, counting the number of such maximum time elapses and the total number of such maximum time elapses and the number of echoes received, and counting the time interval between the sending of the first energy pulse and either the receipt of the last echo or the elapse of said maximum time after the sending of the last of a number of pulses, whereby the target distance is proportional to one-half said time interval, less the total time of any elapses of said predetermined maximum time after the sending of a previous pulse, divided by the number of echoes received and multiplied by the velocity of the pulses.

2. Apparatus for measuring the distance from a point to a target comprising: means at the point for sending a pulse of propagatable energy at a predetermined velocity and a particular, narrow wavelength toward the target, a receiver at said point for receiving echo pulses from the target, discriminating means associated with the receiver for generating an output signal in response to receipt by the receiver of an echo having said narrow wavelength, first counting means coupled to the discriminating means and to the pulse-sending means for generating an output signal if no output signal is generated by the discriminating means within a predetermined maximum time elapsing after an actuation of the pulse-sending means, said predetermined time being greater than the maximum time expected for an echo of an energy pulse to be received from the target at a maximum expected distance from the receiver, second counting means being coupled for counting the number of output signals generated by the first counting means, third counting means coupled for measuring the time interval between the sending of the first energy pulse of a predetermined number of pulses and the receipt of an output signal from either the discriminating means or the first counting means, following the sending of the last energy pulse of said predetermined number, said third counting means producing an output signal during said time interval, control means coupled for actuating the energy pulse sending means in response to output signals received simultaneously from either the discriminating means or the first counting means and from the third counting means, whereby, in relation to the number of output signals from the discriminating means, one-half said time interval, less the total of any elapses of said predetermined maximum time, is proportional to the target distance.

3. The apparatus of claim 2 in which said discriminating means comprises filter means receiving all the input to the receiver and generating a first output signal representing any input having said narrow wavelength and a second output signal representing all other wavelengths received, and anticoincidence means coupled for receiving said first and second output signals and generating an output signal of the discriminating means only when a first output signal is received, and not when a second output signal is received simultaneously therewith.

4. The apparatus of claim 2 in which said energy pulse producing means comprises means for generating a beam of light and light-modulating means disposed along the path of said beam and coupled to said control means for passing a pulse of light in response to actuation by said control means.

5. The apparatus of claim 4 in which said receiver and said discriminating means comprise reflecting means in the path of a pulse of light that is reflected from the target reflecting said reflected light to beam-splitting means, said beam-splitting means being adapted to direct any portion of light received thereby having said narrow wavelength into one beam and to direct any other portion having a different wavelength into another beam, first light-detecting means positioned to receive said first beam and to generate a first output signal in response thereto, second light-detecting means positioned to receive said other beam and to generate a second output signal in response thereto, and anticoincidence means coupled for receiving said first and second output signals and generating an output signal of the discriminating means only when a first output signal is received, and not when a second output signal is received simultaneously therewith.

6. The apparatus of claim 2 in which said third counting means comprises time counting means, means for counting a predetermined number of output signals from the discriminating means and from the first counting means, and for generating a stop output signal after said predetermined number of output signals are counted, said time-counting means being coupled to said control means to be actuated thereby to start counting time when the control means actuates the energy pulse sending means the first time and being coupled to be shut off by said stop output signal from said output number counting means, said output number counting means being connected to the control means for said stop output signal to disable the control means.

7. The apparatus of claim 6 including a delay generator connected to be actuated by said stop output signal from the output number counting means and to generate an output signal a predetermined delay time thereafter, said delay generator being coupled for its said output signal to reset the time-counting means, the output number counting means and the second counting means and to enable and actuate the control means to cause the latter to actuate the energy pulse sending means.

8. The apparatus of claim 6 including an oscillator for producing a stream of pulses of predetermined frequency coupled to the first counting means and to the time-counting means of the third counting means.

9. The apparatus of claim 6 in which said first counting means: is coupled to be actuated to start counting a predetermined elapse of time by the actuation of the energy pulse sending means, is adapted to produce an output signal when said time has elapsed, is coupled for its output signal to be counted by said output number counting means, and is adapted to be stopped and reset either by its own signal at the end of said elapsed time or by an output signal from the discriminating means.

10. The apparatus of claim 6 including time delay means associated with the discriminating means for delaying the delivery of the output signal therefrom a predetermined amount.

* * * * *